United States Patent
Owechko

(10) Patent No.: US 10,354,444 B2
(45) Date of Patent: Jul. 16, 2019

(54) RESOLUTION ADAPTIVE MESH THAT IS GENERATED USING AN INTERMEDIATE IMPLICIT REPRESENTATION OF A POINT CLOUD

(71) Applicant: The Boeing Company, Chicago, IL (US)

(72) Inventor: Yuri Owechko, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/663,243

(22) Filed: Jul. 28, 2017

(65) Prior Publication Data

US 2019/0035148 A1 Jan. 31, 2019

(51) Int. Cl.
*G06T 19/00* (2011.01)
*G06T 17/20* (2006.01)

(52) U.S. Cl.
CPC ............ *G06T 17/20* (2013.01); *G06T 19/00* (2013.01)

(58) Field of Classification Search
CPC ........ G06F 17/175; G06F 17/50; G06T 15/08
USPC ........................................................ 345/419
See application file for complete search history.

(56) References Cited

U.S. PATENT DOCUMENTS

| | | |
|---|---|---|
| 8,072,450 B2 | 12/2011 | Chang et al. |
| 8,983,794 B1 | 3/2015 | Motzer et al. |
| 2002/0167518 A1 | 11/2002 | Migdal et al. |
| 2005/0140670 A1* | 6/2005 | Wu ........................ G06T 15/205 345/419 |
| 2006/0142971 A1 | 6/2006 | Reich et al. |
| 2011/0316978 A1 | 12/2011 | Dillon et al. |
| 2012/0301013 A1 | 11/2012 | Gu |
| 2015/0213646 A1 | 7/2015 | Ma et al. |

(Continued)

FOREIGN PATENT DOCUMENTS

FR 2992762 A1 1/2014

OTHER PUBLICATIONS

Eiben, A.E., et al.; "Genetic algorithms with multi-parent recombination," PPSN III: Proceedings of the International Conference on Evolutionary Computation, The Third Conference on Parallel Problem Solving from Nature, 1994, pp. 78-87.

(Continued)

*Primary Examiner* — Thomas J Lett
(74) *Attorney, Agent, or Firm* — Sage Patent Group

(57) ABSTRACT

A method for generating a resolution adaptive mesh for 3-D metrology of an object includes receiving point cloud data from a plurality of sensors. The point cloud data from each sensor defines a point cloud that represents the object. Each point cloud includes a multiplicity of points and each point includes at least location information for the point on the object. The method also includes determining a resolution of each sensor in each orthogonal dimension based on a position of each sensor relative to the object. The method additionally includes generating a surface representation of the object from the point clouds using the resolutions of each sensor. The surface representation of the object includes a resolution adaptive mesh corresponding to the object for metrology of the object. Generating the surface representation includes fitting a mesh to the point clouds using an intermediate implicit representation of each point cloud.

20 Claims, 8 Drawing Sheets

(56) References Cited

U.S. PATENT DOCUMENTS

| | | |
|---|---|---|
| 2015/0294036 A1* | 10/2015 | Bonner .................. G06T 15/08 703/1 |
| 2015/0363972 A1 | 12/2015 | Isaksson et al. |
| 2016/0261844 A1 | 9/2016 | Kadambi et al. |
| 2017/0004649 A1 | 1/2017 | Collet Romea et al. |
| 2017/0010087 A1 | 1/2017 | Polidor et al. |
| 2017/0053438 A1 | 2/2017 | Huang et al. |
| 2017/0193699 A1* | 7/2017 | Mehr ...................... G06T 7/194 |

OTHER PUBLICATIONS

Kennedy, James, et al.; "Particle Swarm Optimization," Proceedings of IEEE International Conference on Neural Networks, IV, 1995, pp. 1942-1948.

Powell, M.J.D.; "An efficient method for finding the minimum of a function of several variables without calculating derivatives," Computer Journal, 7(2), 1964, pp. 155-162.

Kadambi, Achuta, et al.; "Polarized 3D: High-Quality Depth Sensing with Polarization Cues," 2015 IEEE International Conference on Computer Vision, 2015, pp. 3370-3378.

Mahdaoui, Abdelaaziz, et al.; "Comparative Study of Combinatorial 3D Reconstruction Algorithms," International Journal of Engineering Trends and Technology, 2017, pp. 247-251, vol. 48.

European Patent Office; European Search Report for European Application No. 18174588 dated Aug. 15, 2018, 4 Pages.

European Patent Office; Office Action for European Application No. 18173753.7 dated Aug. 30, 2018, 11 Pages.

European Patent Office; Office Action for European Application No. 18174588.6 dated Sep. 10, 2018, 8 Pages.

* cited by examiner

RESOLUTION ADAPTIVE MESH THAT IS GENERATED USING AN INTERMEDIATE IMPLICIT REPRESENTATION OF A POINT CLOUD

CROSS-REFERENCE TO RELATED APPLICATIONS

This application is related to U.S. application Ser. No. 15/663,190, entitled "Resolution Adaptive Mesh for Performing 3-D Metrology of an Object," filed the same date as the present application and is incorporated herein by reference.

This application is also related to U.S. application Ser. No. 15/663,397, entitled "Live Metrology of an Object During Manufacturing or Other Operations," filed the same date as the present application and is incorporated herein by reference.

FIELD

The present disclosure relates to performing measurements during factory assembly or other processes on an object being manufactured, and more particularly to generating a resolution adaptive mesh, that is generated using an intermediate implicit representation of a point cloud, and that is used for three-dimensional (3-D) metrology of an object being assembled or manufactured.

BACKGROUND

Metrology is the accurate measurement of an object's shape during factory assembly or other processes or for other purposed where accurate measurements are needed. The raw data from 3-D sensors used for metrology is usually in the form of point clouds, or a list of the 3-D coordinates of measured points. Point clouds are difficult to interpret or manipulate, so they are normally converted into a mesh surface representation of the object similar to what is used in computer graphics to represent computer generated objects for display. While many methods have been developed for generating surfaces from point clouds, such as splines or regularized least-squares fitting algorithms, none of these techniques incorporate prior knowledge of how a sensor's accuracy varies with location in viewing direction. 3-D sensors typically have different accuracies in directions along the viewing vector and transverse to the viewing vector, and also for different distances from the measured object. These varying accuracies can lead to increased time and labor in assembling large, complex objects, such as aircraft. Accordingly, there is a need for a system and method for accurately producing a mesh surface representation of an object that take into account these inaccuracies.

SUMMARY

In accordance with an embodiment, a method for generating a resolution adaptive mesh for 3-D metrology of an object includes receiving point cloud data from a plurality of sensors. The point cloud data from each sensor defines a point cloud that represents the object. Each point cloud includes a multiplicity of 3-D points and each 3-D point includes at least location information for the 3-D point on the object. The method also includes determining a resolution of each sensor in each of three orthogonal dimensions based on a position of each sensor relative to the object and physical properties of each sensor. The method additionally includes generating a surface representation of the object from the point clouds using the resolutions of each sensor. The surface representation of the object includes a resolution adaptive mesh corresponding to the object for 3-D metrology of the object. Generating the surface representation includes fitting a mesh to the point clouds using an intermediate implicit representation of each point cloud.

In accordance with another embodiment, a system for generating a resolution adaptive mesh for 3-D metrology of an object includes a plurality of sensors for collecting electronic images of an object. The electronic images include 3-D point cloud data of the object. The system also includes a processor and a resolution adaptive mesh module operating on the processor. The resolution adaptive mesh module is configured to perform a set of functions including receiving point cloud data from the plurality of sensors. The point cloud data from each sensor defines a point cloud that represents the object. Each point cloud includes a multiplicity of 3-D points and each 3-D point includes at least location information for the 3-D point on the object. The set of functions also includes determining a resolution of each sensor in each of three orthogonal dimensions based on a position of each sensor relative to the object and physical properties of each sensor. The set of functions additionally includes generating a surface representation of the object from the point clouds using the resolutions of each sensor. The surface representation of the object includes a resolution adaptive mesh corresponding to the object for 3-D metrology of the object. Generating the surface representation includes fitting a mesh to the point clouds using an intermediate implicit representation of each point cloud.

In accordance with a further embodiment, a computer program product for generating a resolution adaptive mesh for 3-D metrology of an object includes a computer readable storage medium having program instructions embodied therewith. The computer readable storage medium is not a transitory medium per se. The program instructions are executable by a device to cause the device to perform a method including receiving point cloud data from a plurality of sensors. The point cloud data from each sensor defines a point cloud that represents the object. Each point cloud includes a multiplicity of 3-D points and each 3-D point includes at least location information for the 3-D point on the object. The method also includes determining a resolution of each sensor in each of three orthogonal dimensions based on a position of each sensor relative to the object and physical properties of each sensor. The method additionally includes generating a surface representation of the object from the point clouds using the resolutions of each sensor. The surface representation of the object includes a resolution adaptive mesh corresponding to the object for 3-D metrology of the object. Generating the surface representation includes fitting a mesh to the point clouds using an intermediate implicit representation of each point cloud.

In accordance with another embodiment or any of the previous embodiments, the method or set of functions further includes using the intermediate implicit representation of each point cloud to generate a denoised and uniformly sampled 3-D synthetic point cloud including a multiplicity of control points and fitting the mesh to the control points to generate the resolution adaptive mesh.

In accordance with another embodiment or any of the previous embodiments, the method or set of functions also includes forming a 3-D surface evidence function by performing a 3-D convolution of a point spread function of a particular sensor with each 3-D point measured by the particular sensor for each of the plurality of sensors or at least a sampled subset of 3-D points measured by the particular sensor. The point spread function represents resolution properties of the particular sensor in terms of an uncertainty volume around each measured point.

In accordance with another embodiment or any of the previous embodiments, the point spread function is modeled as a multivariate Gaussian distribution with position, shape and orientation reflecting resolution properties of the particular sensor.

In accordance with another embodiment or any of the previous embodiments, performing the convolution includes replacing each 3-D point with an associated 3-D point spread function of the particular sensor at a location of the 3-D point in an associated point cloud and summing point spread function values at each spatial location.

In accordance with another embodiment or any of the previous embodiments, the method or set of functions also includes determining an isocontour of the 3-D surface evidence function by setting the 3-D surface evidence function equal to a preset threshold value.

In accordance with another embodiment or any of the previous embodiments, the method or set of functions additionally includes adjusting a sampling density of 3-D points and the preset threshold value for the isocontour to provide a particular surface representation that optimizes an accuracy and surface coverage of the object.

In accordance with another embodiment or any of the previous embodiments, the method or set of functions further includes generating a 3-D synthetic point cloud of control points using the isocontour of the 3-D surface evidence function. A distribution of the control points provides a resolution-aware representation of a surface of the object.

In accordance with another embodiment or any of the previous embodiments, the control points inherit resolution adaptation and denoising properties of the surface evidence function.

In accordance with another embodiment or any of the previous embodiments, the method or set functions also include fitting a mesh to the control points. The control points are uniformly distributed within the isocontour of the surface evidence function to generate the resolution adaptive mesh representation of the object from the isocontour.

In accordance with another embodiment or any of the previous embodiments, the method or set of functions also includes dividing a measurement volume defined by the point cloud data into a multiplicity of voxels. The method or set of functions additionally includes setting a value of each voxel to a number of measured points contained within a volume of each voxel to create a voxel volume function and creating a 3-D multivariate point spread function for each 3-D point in each voxel. The method or set of functions additionally includes performing a 3-D convolution of each voxel volume function with a corresponding 3-D multivariate point spread function for each 3-D point in each voxel to generate an output voxel volume function for each voxel. The method or set of functions further include determining an index for each output voxel volume greater than a predetermined threshold value which defines an isocontour and creating the intermediate implicit representation of each point cloud by placing a point in a center of each output voxel containing one of the indices.

In accordance with another embodiment or any of the previous embodiments, the method or set of functions also include fitting the mesh to the intermediate implicit point cloud representation to provide a fitted mesh.

In accordance with another embodiment or any of the previous embodiments, the method or set of functions further includes using the vertices of the fitted mesh as a denoised and compressed point cloud to generate the resolution adaptive mesh. The resolution adaptive mesh defining the surface representation of the object.

The features, functions, and advantages that have been discussed can be achieved independently in various embodiments or may be combined in yet other embodiments further details of which can be seen with reference to the following description and drawings.

DETAILED DESCRIPTION

Figure 1:
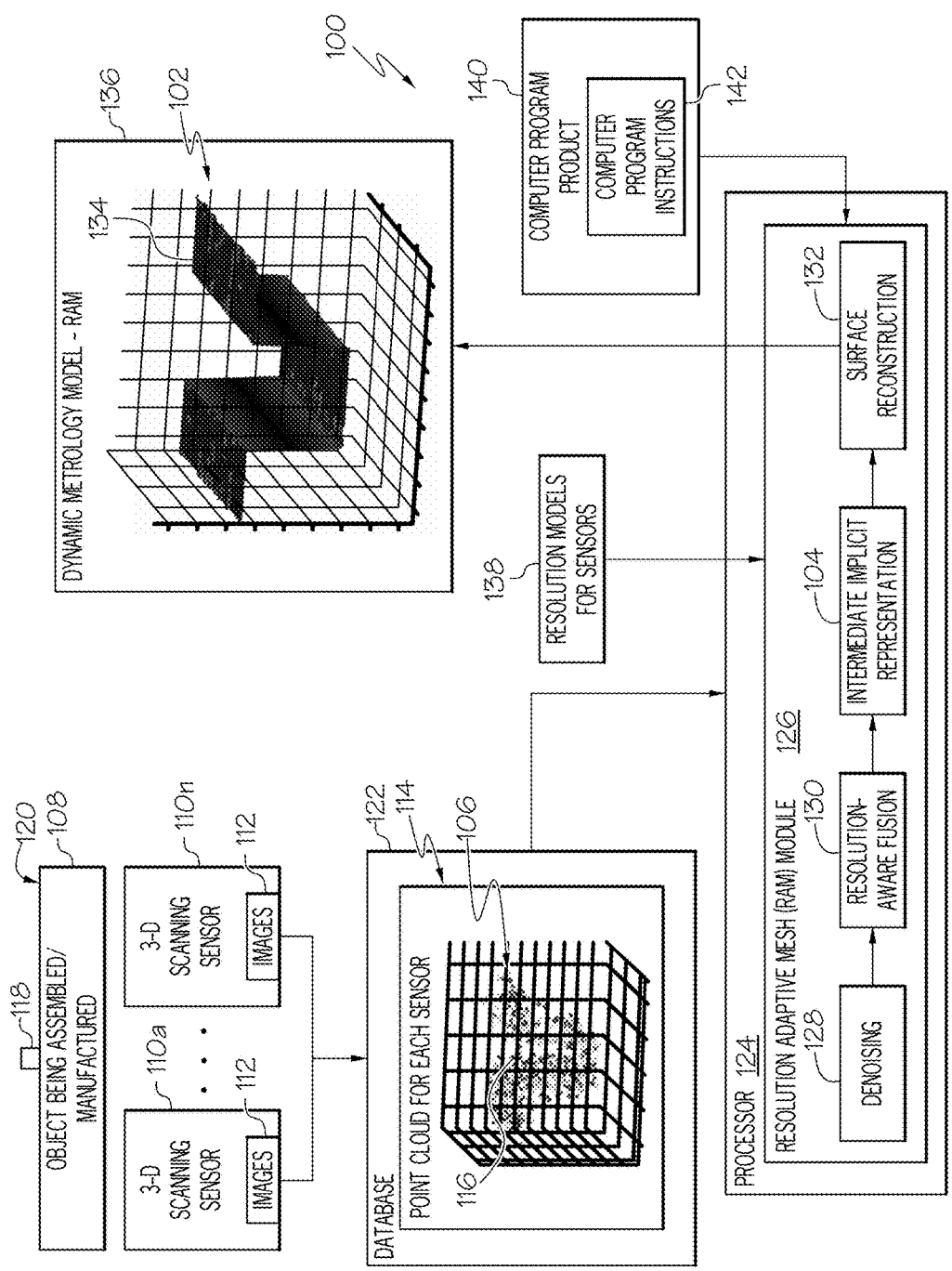
FIG. 1 is a block schematic diagram of an example of a system for generating a resolution adaptive mesh using an intermediate implicit representation of a point cloud in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In accordance with an embodiment, a system and method are provided for representing and optimally combining 3-D point cloud data generated by a plurality of 3-D scanning sensors that measures and tracks objects in large spatial volumes such as a factory floor during an assembly process of such an object, such as an aircraft. Each of the 3-D scanning sensors may be any type of 3-D scanning sensor. Examples of a 3-D scanning sensor include but are not limited to a 3-D camera, Light Detection and Ranging (LIDAR) device or system, or other 3-D sensing system. The method or system converts point clouds into a surface representation useful for metrology while taking into account the spatial varying resolutions in different directions of the plurality of 3-D scanning sensors observing the same object. The method or system does this by converting the point cloud or point clouds into an optimized point cloud for mesh fitting using an intermediate implicit representation of the point cloud or point clouds that takes into consideration resolution of each of the 3-D scanning sensors. This is in contrast to existing surface reconstruction methods that weight all points equally and don't incorporate sensor resolution models or prior knowledge about the expected resolution of the sensors as a function of viewing direction and distance from the object. The method or system optimizes the 3-D surface representation of the object derived from fusion of the point clouds from the plurality of 3-D scanning sensors observing the same object but from different directions and distances.

Different sensor types have different transverse and range resolutions and point density (3-D measured point density) is dependent on the range of the 3-D scanning sensor from the object being measured. For example, multi-view stereo type sensors or cameras (augmented with structured light if needed) are dense and accurate at short ranges but range accuracy decays as $1/R^2$ (inverse of the range squared) while transverse resolution decays as $1/R$. LIDAR is sparse and more accurate than multi-view stereo type sensors at long range, but less accurate at short range. Each sensor can also have different resolutions and point densities for different distances and directions relative to the object being measured. No single existing sensor can provide the required 3-D metrology accuracy over a large measurement volume, such as that needed for assembly or manufacturing of an aircraft or similar object. Therefore, a sensor fusion framework, as described herein, is needed that optimizes accuracy over the entire sensing volume by incorporating prior knowledge of each sensor's resolution and the object to be measured in the fusion of 3-D point cloud data from multiple sensors with different resolution characteristics. Metrology applications need to provide a non-probabilistic and continuous surface representation of objects for measuring deviations from designs, position of objects, intuitive visualizations, and data compression. Resolution-aware adaptive mesh fitting to the fused point cloud, as described herein, results in an optimal surface representation that utilizes the best sensors and sensing directions for every local location and geometry of the point cloud.

Figure 6:
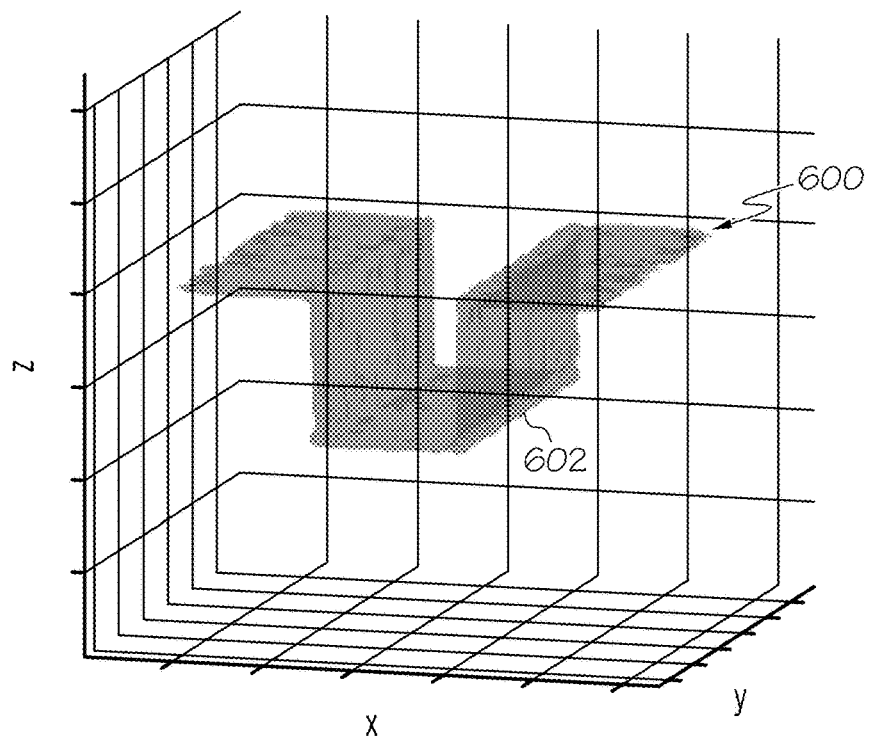
FIG. 6 is an example of determining an isocontour of a 3-D surface evidence function in accordance with an embodiment of the present disclosure.

FIG. 1 is a block schematic diagram of an example of system 100 for generating a resolution adaptive mesh 102 using an intermediate implicit volumetric representation 104 or intermediate implicit volumetric representation of a point cloud or point clouds 106 in accordance with an embodiment of the present disclosure. An example of an intermediate implicit volumetric representation 104 of a point cloud 106 is illustrated in FIG. 6. In accordance with an embodiment, the intermediate implicit volumetric representation 104 of a point cloud 106 includes a synthetic point cloud 700 of 3-D control points 702. The resolution adaptive mesh 102 is used for 3-D metrology of an object 108. The system 100 includes a plurality of sensors 110a-110n or 3-D scanning sensors for collecting 3-D electronic images 112 of the object 108. Examples of the sensors 110a-110n include but are not necessarily limited to digital cameras, Light Detection and Ranging (LIDAR) devices or systems, 3-D laser scanning devices or systems, 3-D time-of-flight (ToF) cameras, or similar imaging devices or systems. The 3-D electronic images 112 include 3-D point cloud data 114 of the object 108. The point cloud data 114 from each sensor 110a-110n or 3-D scanning sensor defines a point cloud 106 that represents the object 108. Each point cloud 106 includes a multiplicity of points 116 or measured 3-D points and each point 116 includes at least location information for a corresponding point 118 on a surface 120 of the object 108. The 3-D point cloud data 114 or point cloud 106 from each sensor 110a-110n is stored in a database 122 or other data storage device. In accordance with an embodiment, the object 108 is an aircraft or portion of an aircraft that is being assembled or manufactured, or for some other reason the resolution adaptive mesh 102, as described herein, is needed for 3-D metrology of the aircraft or portion of the aircraft. In other embodiments, the object 108 is any product or item or portion of a product or item being assembled or manufactured, or for some other purpose the resolution adaptive mesh 102 as described herein is needed to perform 3-D metrology on the product or item.

The sensors 110a-110n or 3-D scanning sensors are located at different locations relative to the object 108 and hence will have different viewing directions of the object 108. The sensors 110a-110n will have different measurement accuracies and resolutions in directions along a viewing vector to the object 108 and transverse to the viewing vector, and also for different distances from the object 108. In accordance with an embodiment, the sensors 110a-110n are different types of sensors similar that described in U.S. application Ser. No. 15/663,397, entitled "Live Metrology of an Object During Manufacturing or Other Operations."

The system 100 also includes a processor 124. A resolution adaptive mesh module 126 for generating the resolution adaptive mesh 102 surface representation of the object 108 is operable on the processor 124. In accordance with an embodiment, the resolution adaptive mesh module 126 includes a denoising element 128, a resolution-aware fusion element 130, and a surface reconstruction element 132 for generating a surface representation 134 of the object 108 including the resolution adaptive mesh 102 that is usable for 3-D metrology of the object 108. The intermediate implicit volumetric representation of 104 of the point cloud 106 or point clouds is an output from the resolution-aware fusion 130. In accordance with an embodiment described herein, denoising 128, resolution-aware fusion 130 and surface reconstruction 132 are implemented simultaneously during construction of the surface representation 134 of the object 108. The surface reconstruction 132 to generate the surface representation 134 of the object 108 is a dynamic metrology model 136 that is usable for 3-D metrology of the object 108 during assembly or manufacturing because the dynamic metrology model 136 is formed from or includes the resolution adaptive mesh 102 that accounts for the spatially varying resolutions of each of the plurality of sensors 110a-110n or 3-D scanning sensors and automatically uses the optimal or best resolution 3-D point cloud data 114 from each sensor 110a-110n as described in more detail herein.

The resolution adaptive mesh module 126 is configured to perform a set of functions that include receiving 3-D point cloud data 114 from the plurality of sensors 110a-110n. As previously described, the point cloud data 114 from each sensor 110a-110n defines a point cloud 106 that represents the object 108. Each point cloud 106 includes a multiplicity of points 116 and each point 116 includes at least location information for the corresponding point 118 on the object 108. The set of functions also includes determining a resolution of each sensor 110a-110n in each of three orthogonal dimensions based on a position of each sensor 110a-110n relative to the object 108 and physical properties of each sensor 110a-110n. The physical properties of each sensor 110a-110n determine the resolution of each sensor in each of the three orthogonal dimensions. For a stereo camera sensor, the properties include but are not necessarily limited to the separation between the cameras, camera focal lengths, and imaging sensor size. For a LIDAR sensor, the properties include but are not necessarily limited to the optical pulse duration, optical pulse size, optical pulse repetition rate, and LIDAR rotation rate. The set of functions further includes generating the surface representation 134 of the object 108 from the point clouds 106 using the resolutions of each sensor 110a-110n. As previously described, the surface representation 134 of the object 108 includes the resolution adaptive mesh 102 corresponding to the object 108 for 3-D metrology of the object 108. Generating the surface representation 134 of the object 108 includes fitting a mesh to the point clouds 106 using the intermediate implicit volumetric representation 104 of the point clouds 106 as described in more detail herein. In accordance with an embodiment, a mesh is fit to the intermediate implicit volumetric representation 104 of the point clouds 106 similar to that described in U.S. application Ser. No. 15/663,190, entitled "Resolution Adaptive Mesh for Performing 3-D Metrology of an Object."

Figure 2:
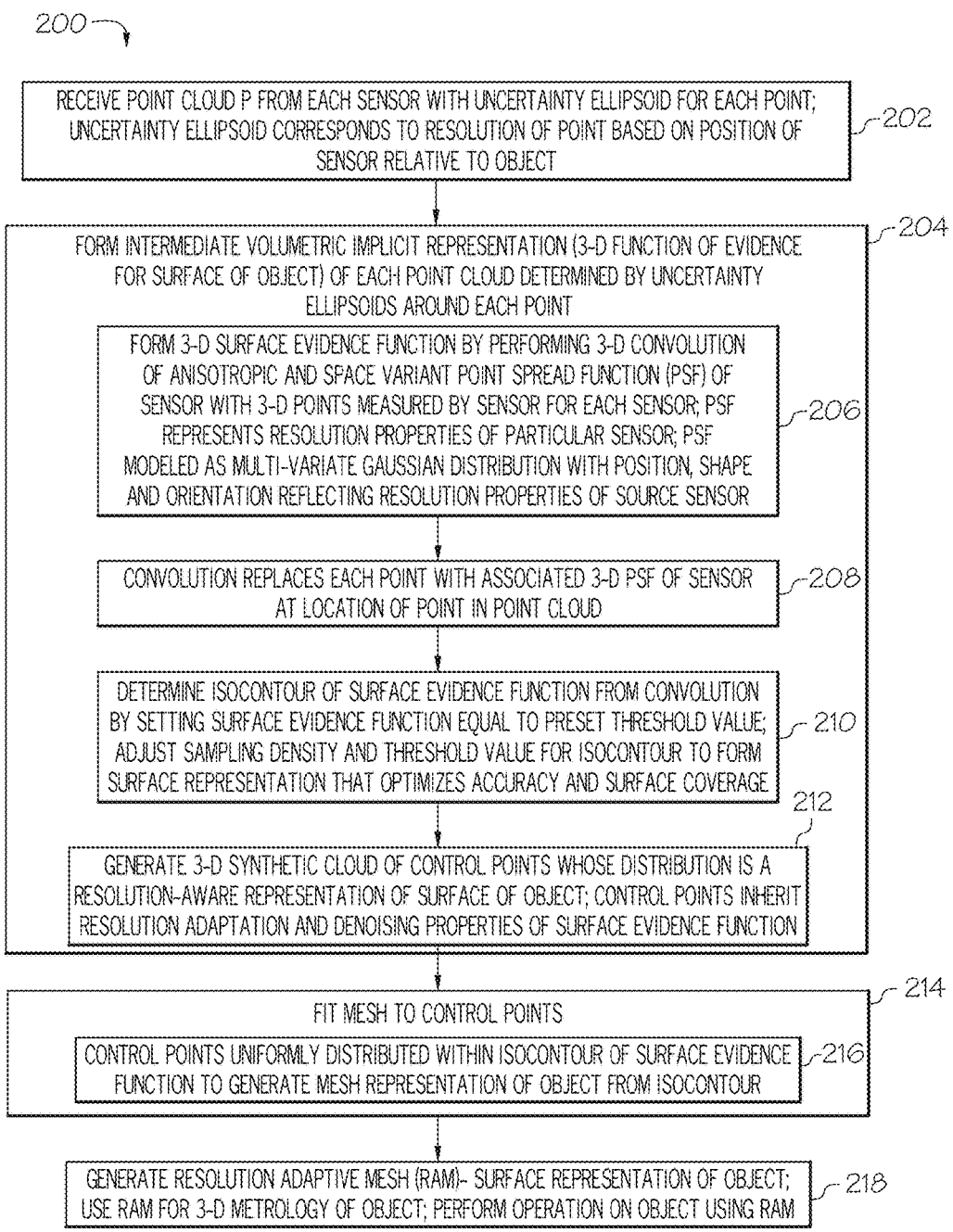
FIG. 2 is a flow chart of an example of a method for generating a resolution adaptive mesh using an intermediate implicit representation of a point cloud in accordance with an embodiment of the present disclosure.
Figure 3:
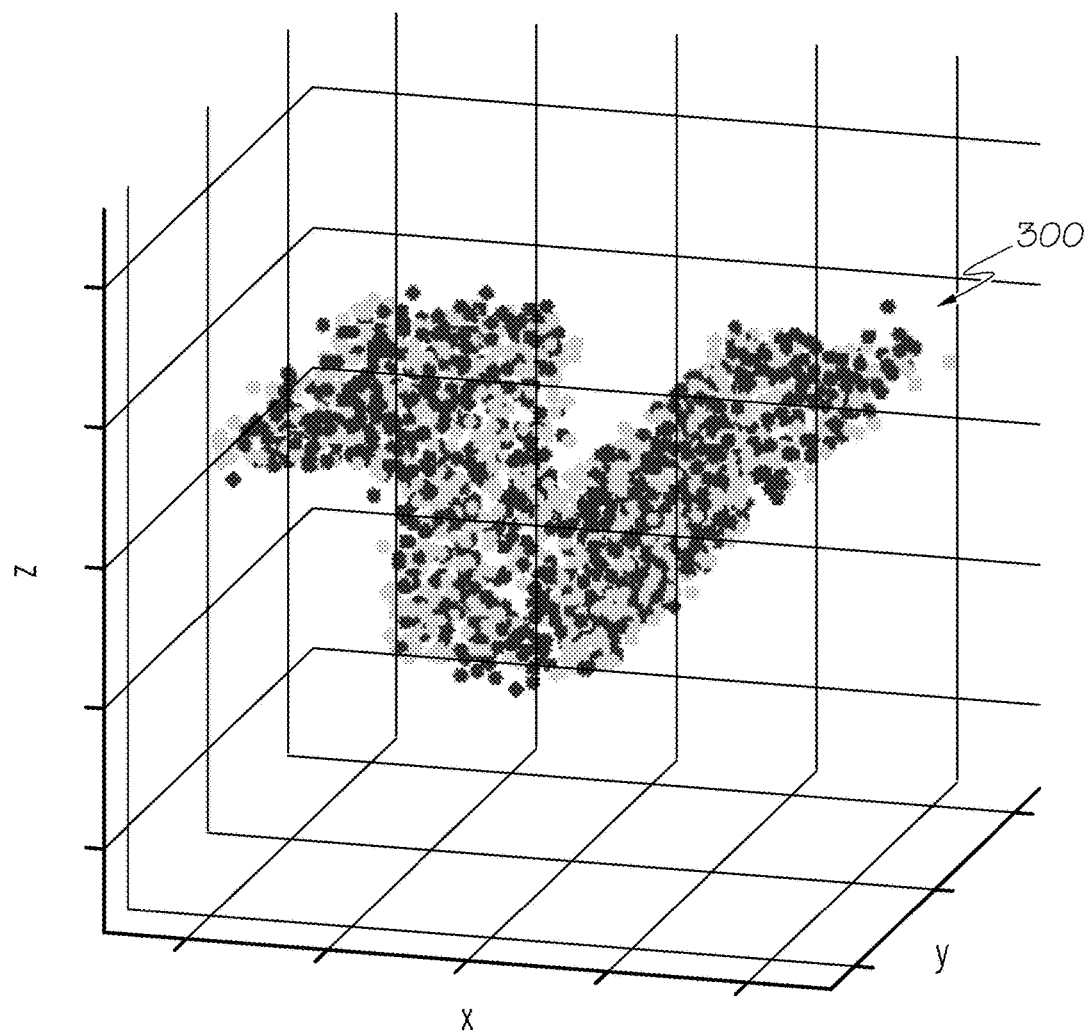
FIG. 3 is an example of a plurality of registered point clouds from a plurality of sensors in accordance with an embodiment of the present disclosure.
Figure 4:
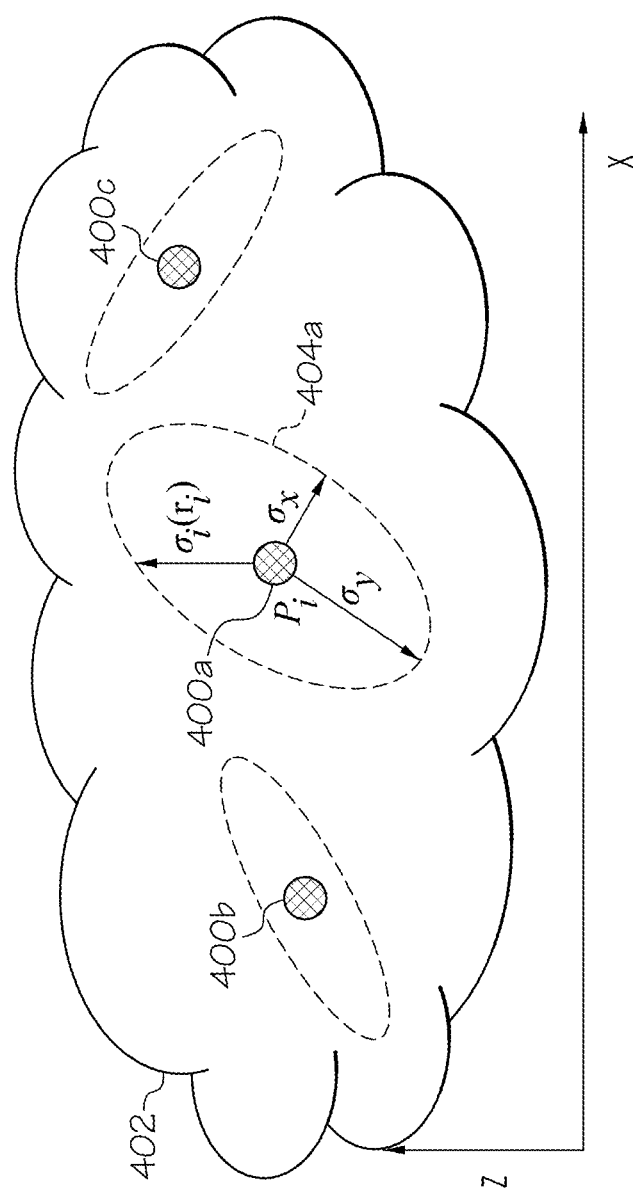
FIG. 4 is an example of measured points in a point cloud and associated uncertainty ellipsoids in accordance with an embodiment of the present disclosure.

FIG. 2 is a flow chart of an example of a method 200 for generating a resolution adaptive mesh using an intermediate implicit representation of a point cloud in accordance with an embodiment of the present disclosure. In accordance with an embodiment, the method 200 is embodied in and performed by the system 100 or resolution adaptive mesh module 126 in FIG. 1. In block 202, point cloud data is received from a plurality of sensors, such as sensors 110a-110n in FIG. 1. The point cloud data from each sensor defines a point cloud that represents the object. Each point cloud includes a multiplicity of 3-D points measured by the sensor and each measured 3-D point includes at least location information for a corresponding point on the object. The location information includes at least 3-D coordinate information (x, y, z) for the point on the object. Receiving the point cloud data includes receiving the point cloud from each sensor and an uncertainty ellipsoid for each measured 3-D point. The uncertainty ellipsoids are used to determine the resolution of each sensor based on the position of the sensor relative to the object. Referring also to FIGS. 3 and 4, FIG. 3 is an example of a plurality of point clouds 300 of an exemplary object in accordance with an embodiment of the present disclosure. The point clouds 300 are illustrated in an x, y, z coordinate system to represent the 3-D location information of a corresponding measured 3-D point on the object associated with each measured 3-D point in the point clouds 300. FIG. 4 is an example of measured 3-D points $P_i$ (P subscript i) 400a-400c in a point cloud (PC) 402 and corresponding uncertainty ellipsoids 404a-404c in accordance with an embodiment of the present disclosure. The point cloud 402 is the same as one of the point clouds 300 in FIG. 3. The measured 3-D points 400a-400c are illustrated in association with 3-D axes x, y, z with the y axis coming out of the page. The points 400a-400c are a subset of points in point clouds 300.

Resolutions of each sensor or 3-D scanning sensor are determined in each of three orthogonal dimensions (x, y, z) based on a position of each sensor relative to the object and physical properties of each 3-D scanning sensor. The resolutions for each sensor for different viewing directions and distances relative to the object are provided by resolution models 138 in FIG. 1. The resolution models 138 are determined analytically from sensor physical models or empirically from measurements of resolution targets at several positions that are interpolated to cover the entire measurement volume. Values of resolution or measurement uncertainty are associated with each measured 3-D point ($P_i$) 400a-400c in the point cloud 402.

Each measured 3-D point ($P_i$) 400a-400c in the point cloud 402 is defined by its position or coordinates and an the associated position-dependent uncertainty ellipsoid 404a-404c as follows:

$$P_i=[x_i,y_i,z_i,\sigma_x,\sigma_y,\sigma_z,\theta,\phi]$$

The ellipsoid axes correspond to the resolutions or standard deviations $\sigma_x$, $\sigma_y$, $\sigma z$, ($\sigma$ subscript x, y, or z) in range and two transverse directions of the measured point ($P_i$) 400a-400c on the object as seen from the sensor that measured the point ($P_i$) 400a-400c. The orientation of the ellipsoid 404a is represented by the two angles $\theta$ and $\phi$.

In block 204, an intermediate volumetric representation of each point cloud or fusion of point clouds is formed. The intermediate volumetric representation of each point cloud is formed based on the uncertainty ellipsoids around each point. The intermediate volumetric representation defines a 3-D function of evidence for the surface of the object determined by the uncertainty ellipsoids of each measured 3-D point of the point cloud. In accordance with an embodiment, blocks 206-212 are elements of block 204.

Figure 5:
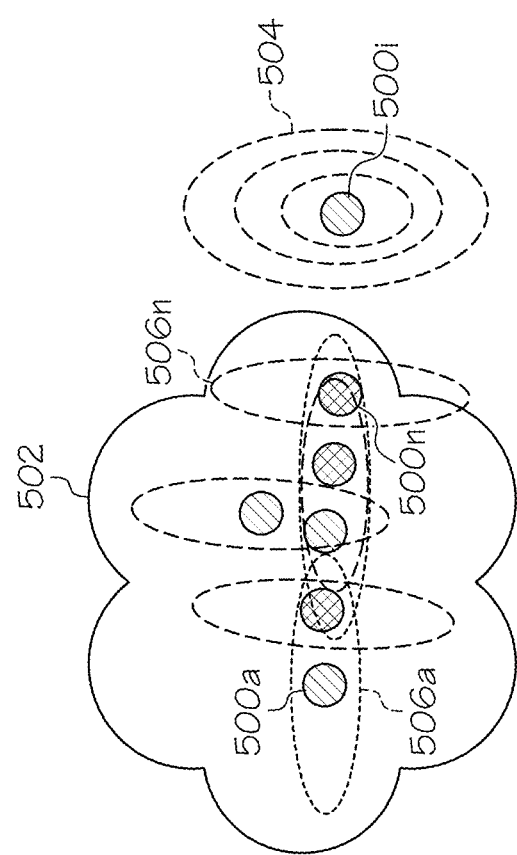
FIG. 5 is an example of performing a 3-D convolution of measured points in a point cloud with a point spread function of a particular sensor that measured the points in accordance with an embodiment of the present disclosure.

In block 206, a 3-D surface evidence function is formed by performing a 3-D convolution of a point spread function of a particular sensor with each 3-D point measured by the particular sensor or with at least a sampled subset of 3-D points measured by each particular sensor or a source sensor for each of the plurality of sensors. The individual point convolutions are summed at each spatial location in order to form the surface evidence function. The point spread function represents resolution properties of the particular sensor in terms of an uncertainty volume around each measured point. Referring also to FIG. 5, FIG. 5 is an example of performing a 3-D convolution of measured 3-D points or a subset of 3-D measured points 500a-500n in a point cloud 502 with a point spread function 504 of a particular sensor that measured the 3-D points 500a-500n in accordance with an embodiment of the present disclosure. Each of the 3-D points 500a-500n has an associated uncertainty ellipsoid 506a-506n used to determine the resolution of the sensor that measured the 3-D points 500a-500n as previously described.

The point spread function represents resolution properties of the particular sensor. In accordance with an embodiment, the point spread function is an anisotropic and space variant point spread function. The point spread functions and the uncertainty ellipsoids are the same. The point spread functions are used herein as a measure of the uncertainty. The point spread function represents the uncertainty in position of each 3-D point measured by a particular sensor in all directions. In accordance with an example, the point spread function is modeled as a multivariate Gaussian distribution with position, shape and orientation reflecting resolution properties of the particular sensor or source sensor. The point spread function is derived from a priori sensor models, such as resolution models 138, or measured empirically from point clouds of sharp edges of any object used as a 3-D resolution target where the edge curvature is much less than the sensor's resolution.

In block 208, performing the convolution includes replacing each 3-D measured point or subset of 3-D measured points with an associated 3-D point spread function of the particular sensor at a location of the 3-D measured point in an associated point cloud. In accordance with an embodiment, the input point cloud is subsampled before performing the convolution in order to save storage and processing time, however, the accuracy of the final representation would be reduced. In some applications involving very large point clouds such a trade-off may be desirable.

In block 210, an isocontour of the 3-D surface evidence function is determined by setting each 3-D surface evidence function equal to a preset threshold value. A sampling density of 3-D points and the preset threshold value are adjusted for the isocontour to provide a particular surface representation that optimizes an accuracy and surface coverage of the object. As more measured 3-D points are sampled for each particular sensor, the more likely locations of the surface of the object will correspond to voxels with the highest overlapping point spread functions. The point spread function is represented as a multi-variate continuous Gaussian function. The voxels are a 3-D sampling on a regularly spaced 3-D grid of the overlapping and summed point spread functions. Referring also to FIG. 6, FIG. 6 is an example of determining an isocontour 600 of a 3-D surface evidence function in accordance with an embodiment of the present disclosure. The isocontour 600 is illustrated in an x, y, z coordinate system. The isocontour 600 defines an intermediate implicit volumetric representation 602 of each point cloud which is used to generate a surface representation of the object that takes into consideration the resolution of each of the sensors. The intermediate implicit volumetric representation 602 of each point cloud is used to generate a denoised and uniformly sampled 3-D synthetic point cloud that includes a multiplicity of control points as described with reference to FIG. 7.

Figure 7:
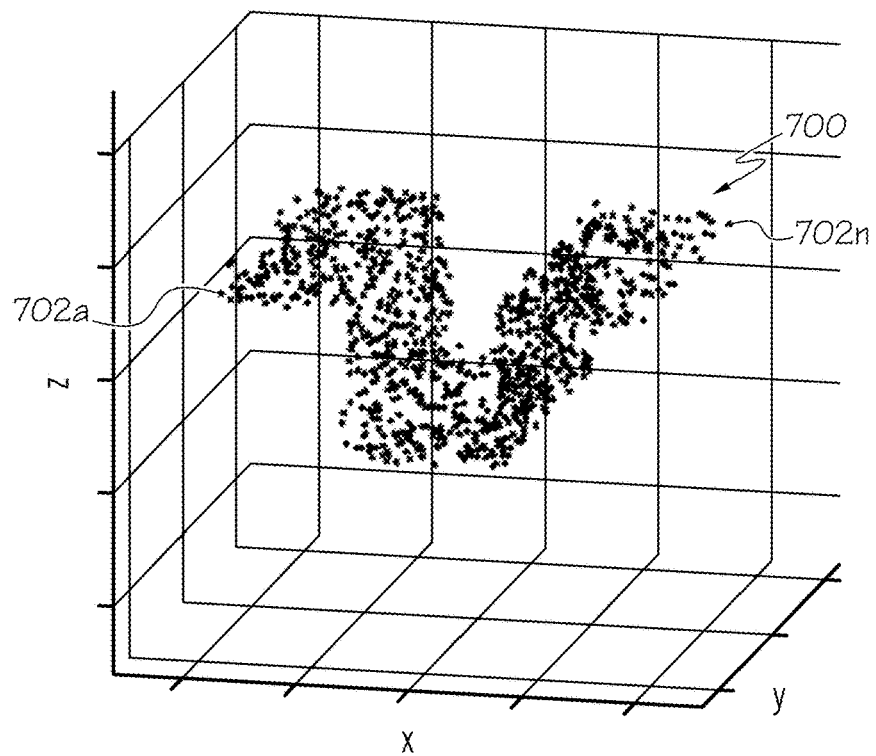
FIG. 7 is an example of generating a synthetic point cloud of 3-D control points using the isocontour of the 3-D surface evidence function in accordance with an embodiment of the present disclosure.

In block 212, a 3-D synthetic point cloud of control points is generated using the isocontour 600 of the 3-D surface evidence function or intermediate implicit volumetric representation 602 of each point cloud. Referring also to FIG. 7, FIG. 7 is an example of generating a synthetic point cloud 700 of 3-D control points 702a-702n using the isocontour 600 of the 3-D surface evidence function or intermediate implicit volumetric representation 602 of each point cloud in accordance with an embodiment of the present disclosure. The synthetic point cloud 700 is illustrated in a 3-D coordinate (x, y, z) system. The distribution of the control points 702a-702n provides a resolution-aware representation of a surface of the object. The control points 702a-702n inherit resolution adaptation and denoising properties of the surface evidence function. Accordingly, the intermediate implicit volumetric representation 602 of each point cloud is used to generate a denoised and uniformly sampled 3-D synthetic point cloud 700 that includes a multiplicity of control points 702a-702n.

Figure 8:
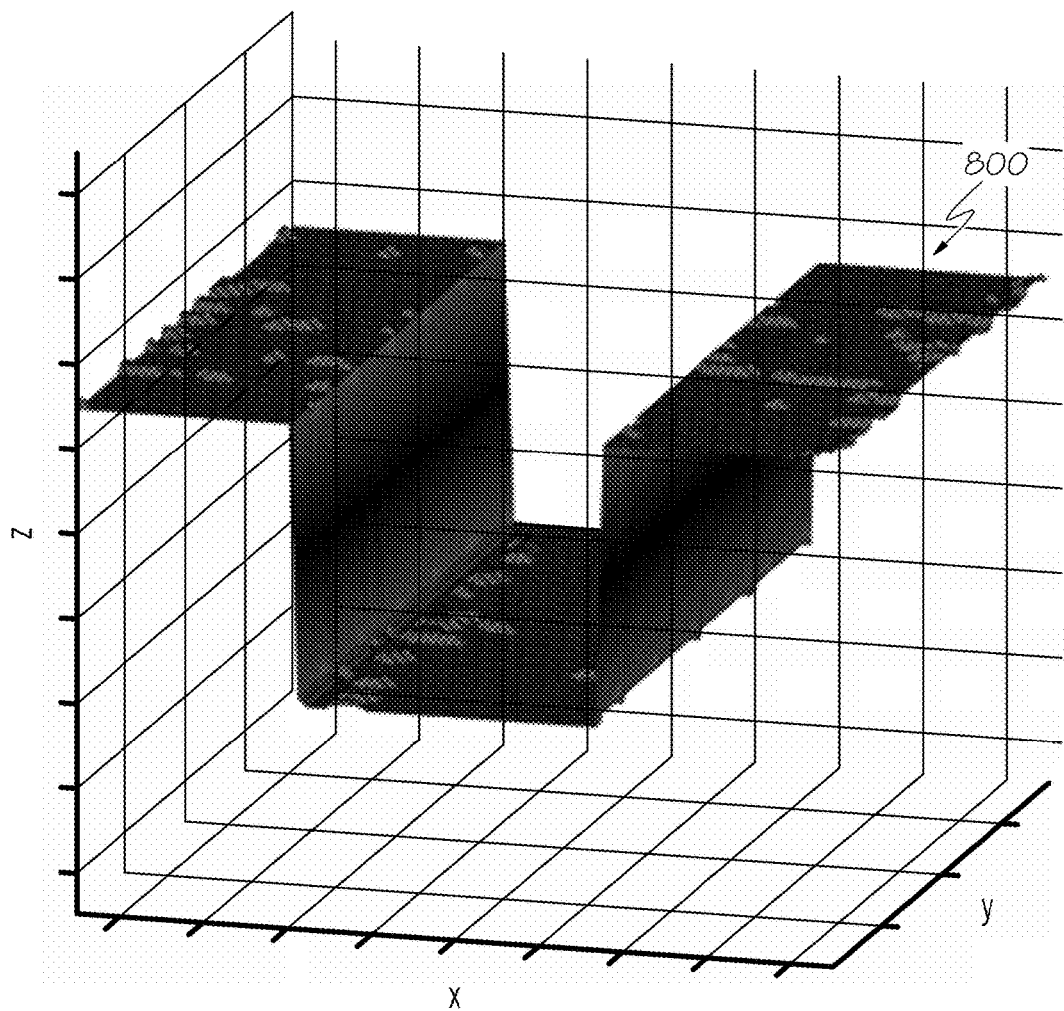
FIG. 8 is an example of fitting a mesh to a set of 3-D control points or synthetic point cloud in accordance with an embodiment of the present disclosure.

In block 214, a mesh is fit to the control points 702a-702n of the 3-D synthetic point cloud 700. In block 216, the control points 702a-702n are uniformly distributed within the isocontour 600 of the surface evidence function to generate a resolution adaptive mesh representation of the object from the isocontour 600 or intermediate implicit volumetric representation 602. Referring also to FIG. 8, FIG. 8 is an example of fitting a mesh 800 to a set of 3-D control points 702a-702n or synthetic point cloud 700 in accordance with an embodiment of the present disclosure. The mesh 800 is a resolution adaptive mesh surface representation of the object for 3-D metrology of the object. The mesh 800 or resolution adaptive mesh is illustrated in a 3-D coordinate (x, y, z) coordinate system. In accordance with an embodiment, the mesh 800 is fit to the 3-D control points 702a-702n as described in U.S. application Ser. No. 15/663, 190, entitled "Resolution Adaptive Mesh for Performing 3-D Metrology of an Object."

In block 218, fitting the mesh to the control points 702a-702n of the 3-D synthetic point cloud 700 in block 214 generates a surface representation of the object that is, in effect, generated from the point clouds using the resolutions of each sensor. The surface representation of the object includes a resolution adaptive mesh corresponding to the object for 3-D metrology of the object. As previously described, the surface representation includes fitting the mesh to the point clouds using an intermediate implicit representation of each point cloud or resolution-aware fusion of a plurality of point clouds. In accordance with another embodiment, the resolution adaptive mesh surface representation of the object is used to perform other operations on the object.

Figure 9:
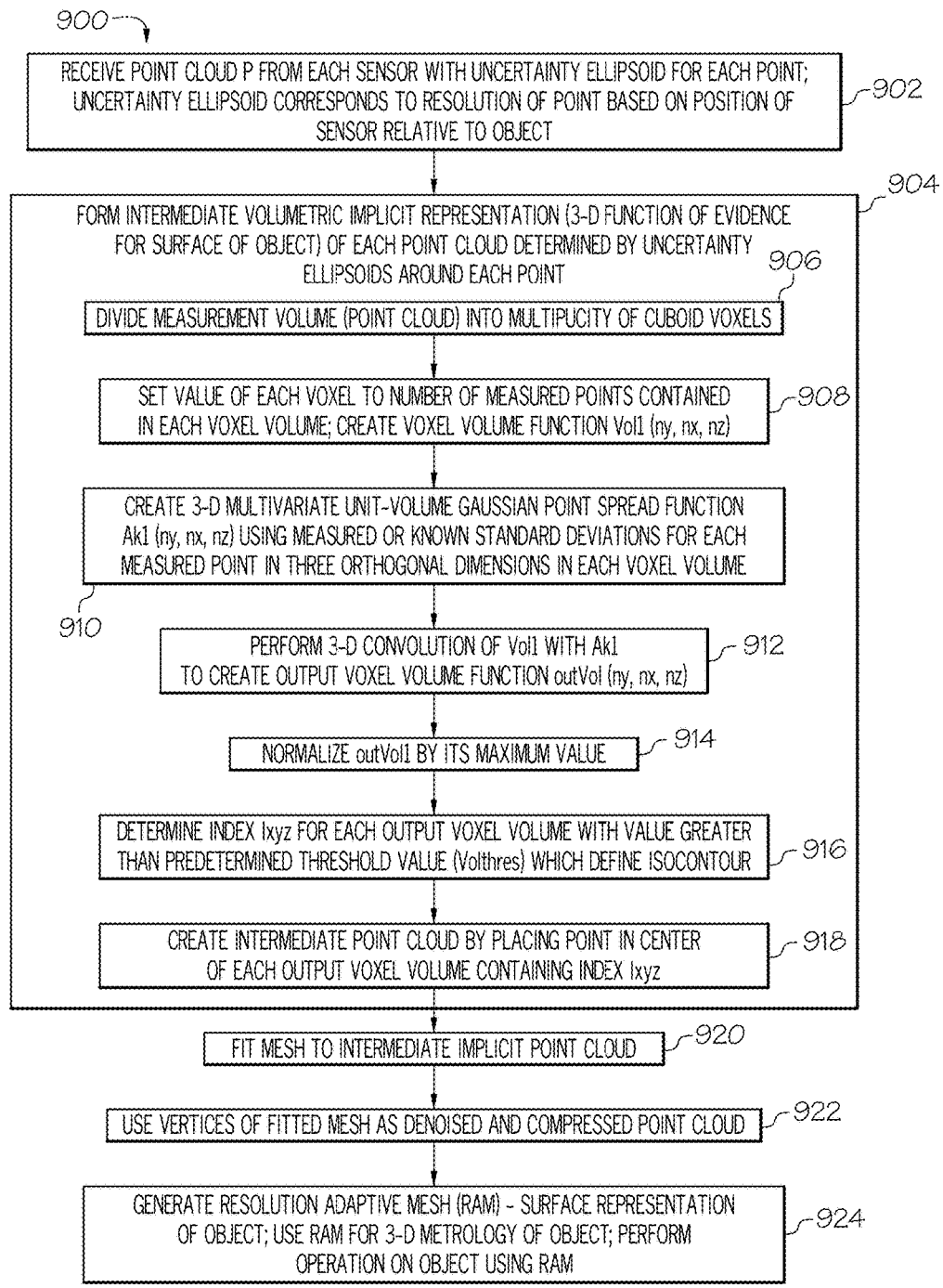
FIG. 9 is a flow chart of an example of a method for generating a resolution adaptive mesh using an intermediate implicit representation of a point cloud in accordance with another embodiment of the present disclosure.

Referring to FIG. 9, FIG. 9 is a flow chart of an example of a method 900 for generating a resolution adaptive mesh using an intermediate implicit representation of a point cloud in accordance with another embodiment of the present disclosure. The method 900 is a slightly different way of generating the resolution adaptive mesh compared to the method 200 in FIG. 2. In the method 200, the point spread function is convolved with all points in the input point cloud. In the method 900, the measurement space is divided into voxels and each voxel is given a value equal to the number of points inside the voxel. The voxels are then convolved with the point spread functions for each sensor type and the results are summed to generate a "Voxel Volume Function". The rest of the processing is the similar to method 200. Accordingly, in the method 200 the point spread functions are convolved directly with the measured points in 3D space while in the method 900 the point spread functions are convolved with a local average of the measured points.

In block 902, point cloud data is received from a plurality of sensors. The point cloud data from each sensor defines a point cloud that represents the object. Each point cloud includes a multiplicity of measured 3-D points and each 3-D point includes at least location information for the 3-D point on the object. The location information includes at least 3-D coordinate information (x, y, z) for the point on the object. Receiving the point cloud data includes receiving the point cloud from each sensor and an uncertainty ellipsoid for each point. The uncertainty ellipsoids are used to determine the resolution of each sensor based on the position of the sensor relative to the object. As previously described, FIG. 4 is an example of measured points $P_i$ (P subscript i) 400a-400c in a point cloud (PC) 402 and corresponding uncertainty ellipsoids 404a-404c in accordance with an embodiment of the present disclosure. The point cloud 402 is the same as one of the point clouds 400 in FIG. 3. The measured 3-D points 400a-400c are illustrated in association with 3-D axes x, y, z with the y axis coming out of the page. The points 400a-400c are a subset of points in point clouds 300.

Resolutions of each sensor or 3-D scanning sensor are determined in each of three orthogonal dimensions (x, y, z) based on a position of each sensor relative to the object and physical properties of each 3-D scanning sensor. The resolutions for each sensor for different viewing directions and distances relative to the object are provided by resolution models 138 in FIG. 1. The ellipsoid axes correspond to the resolutions or standard deviations $\sigma_x$, $\sigma_y$, $\sigma_z$, ($\sigma$ subscript x, y, or z) in range and two transverse directions of the measured point ($P_i$) 400a-400c on the object as seen from the sensor that measured the point ($P_i$) 400a-400c. The orientation of the ellipsoid 404a is represented by the two angles $\theta$ and $\phi$.

In block 904, an intermediate volumetric implicit representation of each point cloud is formed. The intermediate volumetric implicit representation of each point cloud is formed based on the uncertainty ellipsoids around each point. The intermediate volumetric implicit representation defines a 3-D function of evidence for the surface of the object determined by the uncertainty ellipsoids of each point of each point cloud. In accordance with an embodiment, blocks 906-918 are elements of block 904.

In block 906, a measurement volume defined by the point cloud data is divided into a multiplicity of voxels. In accordance with an embodiment, the voxels are cuboid voxels although voxels of other shapes may also be used.

In block 908, a value of each voxel is set to a number of measured points contained within a volume of each voxel to create a voxel volume function Vol1 (ny, nx, nz).

In block 910, a 3-D multivariate point spread function is created for each 3-D point in each voxel. In accordance with an embodiment, the 3-D multivariate point spread function includes a 3-D multivariate unit-volume Gaussian point spread function Ak1 (ny, nx, nz) using measured or known standard deviations for each measured point in three orthogonal dimensions in each voxel volume. The standard deviations correspond to resolutions associated with the sensor that measured the point.

In block 912, a 3-D convolution of each voxel volume function Vol1 with a corresponding 3-D multivariate point spread function Ak1 is performed for each 3-D point or a set of 3-D points in each voxel to generate an output voxel volume function outVol (ny, nx, nz) for each voxel. In block 914, the output voxel volume function is normalized by its maximum value.

In block 916, an index (Ixyz) for each output voxel volume greater than a predetermined threshold value (Volthres) is determined which defines an isocontour similar to isocontour 600 in FIG. 6.

In block 918, an intermediate point cloud or intermediate implicit volumetric representation of each point cloud is created by placing a point in a center of each output voxel containing one of the indices. The intermediate point cloud or intermediate implicit volumetric representation of each point cloud is similar to the intermediate implicit volumetric representation 602 in FIG. 6.

In block 920, a mesh is fit to the intermediate implicit point cloud representation to provide a fitted mesh. In block 922, the vertices of the fitted mesh are used as a denoised and compressed point cloud to generate a resolution adaptive mesh. In accordance with an embodiment, the mesh is fit to the intermediate implicit point cloud as described in U.S. application Ser. No. 15/663,190, entitled "Resolution Adaptive Mesh for Performing 3-D Metrology of an Object."

In block 924, fitting the mesh to the intermediate implicit point cloud in block 922 generates a surface representation of the object that is, in effect, generated from the point clouds using the resolutions of each sensor. The surface representation of the object includes a resolution adaptive mesh corresponding to the object for 3-D metrology of the object. Other operations may also be performed using the resolution adaptive mesh of the object.

In accordance with an embodiment, either of the method 200 or 900 are embodied on a computer program product, such as computer program product 140 in FIG. 1. The computer program product 140 includes a computer readable storage medium similar to that previously described having computer program instructions 142 embodied therewith. The computer readable storage medium is not a transitory medium per se. The program instructions are executable by a device, such as processor 124 in FIG. 1 to cause the device to perform the method 200, 200' or 800. In accordance with an embodiment, the computer program instructions 142 define the resolution adaptive module 126 which is stored on a storage device in association with the processor 124 and are downloadable from the computer program product 140.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for generating a resolution adaptive mesh for 3-D metrology of an object, comprising:
   receiving point cloud data from a plurality of sensors, the point cloud data from each sensor defines a point cloud of a plurality of point clouds from the plurality of sensors, each point cloud representing the object, wherein each point cloud comprises a multiplicity of 3-D points and each 3-D point comprises at least location information for the 3-D point on the object;
   determining a resolution of each sensor in each of three orthogonal dimensions based on a position of each sensor relative to the object and physical properties of each sensor;
   generating a surface representation of the object from the point clouds using the resolutions of each sensor, the surface representation of the object comprising a resolution adaptive mesh corresponding to the object for 3-D metrology of the object, wherein generating the surface representation comprises fitting a mesh to the point clouds using an intermediate implicit representation of each point cloud; and
   performing an operation on the object using the resolution adaptive mesh.

2. The method of claim 1, further comprising:
   using the intermediate implicit representation of each point cloud to generate a denoised and uniformly sampled 3-D synthetic point cloud comprising a multiplicity of control points; and
   fitting the mesh to the control points to generate the resolution adaptive mesh.

3. The method of claim 1, further comprising forming a 3-D surface evidence function by performing a 3-D convolution of a point spread function of a particular sensor with each 3-D point measured by the particular sensor or at least a sampled subset of 3-D points measured by the particular sensor for each of the plurality of sensors, wherein the point spread function represents resolution properties of the particular sensor.

4. The method of claim 3, wherein the point spread function is modeled as a multivariate Gaussian distribution with position, shape and orientation reflecting resolution properties of the particular sensor.

5. The method of claim 3, wherein performing the convolution comprises replacing each 3-D point with an associated 3-D point spread function of the particular sensor at a spatial location of the 3-D point in an associated point cloud and summing point spread function values at each spatial location.

6. The method of claim 3, further comprising determining an isocontour of the 3-D surface evidence function by setting the 3-D surface evidence function equal to a preset threshold value.

7. The method of claim 6, further comprising adjusting a sampling density of 3-D points and the preset threshold value for the isocontour to provide a particular surface representation that optimizes accuracy and surface coverage of the object.

8. The method of claim 6, further comprising generating a 3-D synthetic point cloud of control points using the isocontour of the 3-D surface evidence function, a distribution of the control points providing a resolution-aware representation of a surface of the object.

9. The method of claim 8, wherein the control points inherit resolution adaptation and denoising properties of the surface evidence function.

10. The method of claim 9, further comprising fitting a mesh to the control points, wherein the control points are uniformly distributed within the isocontour of the surface evidence function to generate the resolution adaptive mesh representation of the object from the isocontour.

11. The method of claim 1, further comprising:
dividing a measurement volume defined by the point cloud data into a multiplicity of voxels;
setting a value of each voxel to a number of measured points contained within a volume of each voxel to create a voxel volume function;
creating a 3-D multivariate point spread function for each 3-D point in each voxel;
performing a 3-D convolution of each voxel volume function with a corresponding 3-D multivariate point spread function for each 3-D point in each voxel to generate an output voxel volume function for each voxel;
determining an index for each output voxel volume greater than a predetermined threshold value which defines an isocontour; and
creating the intermediate implicit representation of each point cloud by placing a point in a center of each output voxel containing one of the indices.

12. The method of claim 11, further comprising fitting the mesh to the intermediate implicit point cloud representation to provide a fitted mesh.

13. The method of claim 12, further comprising using the vertices of the fitted mesh as a denoised and compressed point cloud to generate the resolution adaptive mesh, the resolution adaptive mesh defining the surface representation of the object.

14. A system for generating a resolution adaptive mesh for 3-D metrology of an object, comprising:
a plurality of sensors for collecting electronic images of an object, the electronic images comprising 3-D point cloud data of the object;
a processor; and
a resolution adaptive mesh module operating on the processor, the resolution adaptive mesh module being configured to perform a set of functions comprising:
receiving point cloud data from the plurality of sensors, the point cloud data from each sensor defines a point cloud of the plurality of point clouds from the plurality of sensors, each point cloud representing the object, wherein each point cloud comprises a multiplicity of 3-D points and each 3-D point comprises at least location information for the 3-D point on the object;
determining a resolution of each sensor in each of three orthogonal dimensions based on a position of each sensor relative to the object and physical properties of each sensor;
generating a surface representation of the object from the point clouds using the resolutions of each sensor, the surface representation of the object comprising a resolution adaptive mesh corresponding to the object for 3-D metrology of the object, wherein generating the surface representation comprises fitting a mesh to the point clouds using an intermediate implicit representation of each point cloud; and
performing an operation on the object using the resolution adaptive mesh.

15. The system of claim 14, wherein the set of functions further comprises:
using the intermediate implicit representation of each point cloud to generate a denoised and uniformly sampled 3-D synthetic point cloud comprising a multiplicity of control points; and
fitting the mesh to the control points to generate the resolution adaptive mesh.

16. The system of claim 14, wherein the set of functions further comprises forming a 3-D surface evidence function by performing a 3-D convolution of a point spread function of a particular sensor with each 3-D point measured by the particular sensor or at least a sampled subset of 3-D points measured by the particular sensor for each of the plurality of sensors, wherein the point spread function represents resolution properties of the particular sensor.

17. The system of claim 16, wherein the set of functions further comprises:
determining an isocontour of the 3-D surface evidence function by setting the 3-D surface evidence function equal to a preset threshold value; and
adjusting a sampling density of 3-D points and the preset threshold value for the isocontour to provide a particular surface representation that optimizes an accuracy and surface coverage of the object.

18. The system of claim 17, wherein the set of functions further comprises:
generating a 3-D synthetic point cloud of control points using the isocontour of the 3-D surface evidence function, a distribution of the control points providing a resolution-aware representation of a surface of the object, wherein the control points inherit resolution adaptation and denoising properties of the surface evidence function; and
fitting a mesh to the control points, wherein the control points are uniformly distributed within the isocontour of the surface evidence function to generate the resolution adaptive mesh representation of the object from the isocontour.

19. A non-transitory computer program product for generating a resolution adaptive mesh for 3-D metrology of an object, the computer program product comprising a computer readable storage medium having program instructions embodied therewith, wherein the computer readable storage medium is not a transitory medium per se, the program instructions being executable by a device to cause the device to perform a method comprising:

receiving point cloud data from a plurality of sensors, the point cloud data from each sensor defines a point cloud of a plurality of point clouds from the plurality of sensors, each points cloud representing the object, wherein each point cloud comprises a multiplicity of 3-D points and each 3-D point comprises at least location information for the 3-D point on the object;

determining a resolution of each sensor in each of three orthogonal dimensions based on a position of each sensor relative to the object and physical properties of each sensor;

generating a surface representation of the object from the point clouds using the resolutions of each sensor, the surface representation of the object comprising a resolution adaptive mesh corresponding to the object for 3-D metrology of the object, wherein generating the surface representation comprises fitting a mesh to the point clouds using an intermediate implicit representation of each point cloud; and performing an operation on the object using the resolution adaptive mesh.

20. The non-transitory computer program product of claim 19, wherein the method further comprises:

using the intermediate implicit representation of each point cloud to generate a denoised and uniformly sampled 3-D synthetic point cloud comprising a multiplicity of control points; and fitting the mesh to the control points to generate the resolution adaptive mesh.

* * * * *